March 29, 1927.
E. H. W. WEIBULL
ROLLER BEARING
Original Filed April 26, 1919
1,622,985
Fig. 1.
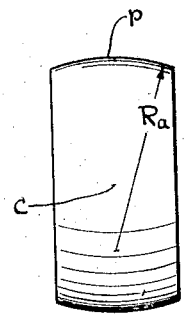
Fig. 2.
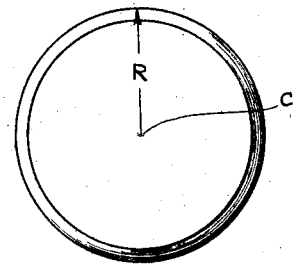
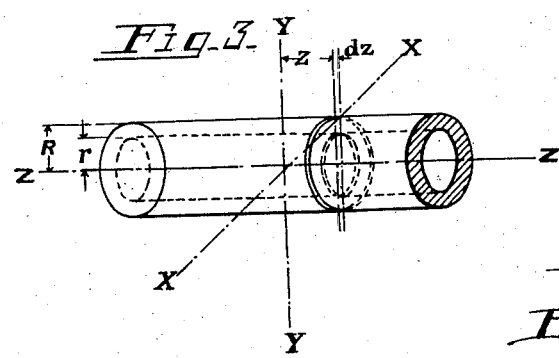
Fig. 3.
Inventor
E. H. W. Weibull,
By H. R. Kerslake
Attorney Patented Mar. 29, 1927.

1,622,985

UNITED STATES PATENT OFFICE.

ERNST HJALMAR WALODDI WEIBULL, OF GOTTENBORG, SWEDEN, ASSIGNOR, BY MESNE ASSIGNMENTS, TO NYA NORDISKA KULLAGER AKTIEBOLAGET, OF GOTTENBORG, SWEDEN.

ROLLER BEARING.

Original application filed April 26, 1919, Serial No. 292,927, and in Sweden October 3, 1918. Divided and this application filed July 15, 1920. Serial No. 396,587.

This invention refers to roller-bearings and more especially to the rollers therein, namely such rollers in which the radius of curvature of the producer, disposed in the axial plane of the bearing is larger than the radius of the sectional figure of the roller in the radial plane of the bearing.

The invention is a division of my application Serial No. 292,927, filed April 26th, 1919, and has for its object to provide rollers, of the kind referred to, which are self-adjusting.

For this purpose a certain relative size is given to the breadth and the radius of the rollers, the reason to this relative size being further explained in the following description.

The principal axes of an ellipsoid are to be regarded as those along the length, breadth and thickness of same, and in an ellipsoid of rotation two axes are always of the same length, but on the other hand in an ellipsoid, which is not an ellipsoid of rotation, said principal axes are all of different size.

If any solid body rotates around an axis passing through its center of gravity, this rotation may proceed without setting up a collapsing couple, if the axis of rotation coincides with either of the three principal axes appertaining to the ellipsoid of inertia of the body. This balance is, however, unstable, if the axis of rotation is another axis than the largest one of the three principal axes, for, if the rotation is taking place around f. i. the smallest principal axis, a couple will be produced, when the body becomes displaced out of the plane of rotation, and even if this displacement is of an infinitesimally small amount, this couple will further augment the displacement of the body. If, on the contrary the body is rotating around its largest principal axis, and becomes displaced slightly out of its plane of rotation, a couple will be produced tending to bring the body back into its original position. The forces of inertia consequently endeavour to turn the body and change its axis of rotation so as to bring it into coincidence with the largest principal axis of the ellipsoid of inertia.

It is to be understood that the term "ellipsoid of inertia" is a technical conception relating to the inertia, which may be imagined as a body having the shape of an ellipsoid, the principal axes of which coincide with the axes of inertia of the real body in question. Thus it is evident that the three principal axes of an ellipsoid of inertia may all be of a different size.

Applied to the case of a roller bearing in which each roller is a solid body of revolution, the ellipsoid of inertia becomes an ellipsoid of revolution by which two of the principal axes are of equal length. It is to be noted that the term "ellipsoid of revolution" is the same as an ellipsoid of rotation and may be a body imagined or real, and such a body will be produced, when an ellipse is turned around one of its two principal axes. Thus, it will be understood, that an ellipsoid of rotation always has three axes, two of which are of equal length. If a body has the shape of an entire ellipsoid of rotation or an ellipsoid of rotation, the ends of which are cut away in planes perpendicular to the axis of rotation, the ellipsoid of inertia will have three axes, two of which are of the same length. The third principal axis, which constitutes the normal axis of revolution of the roller, may be longer, shorter or of the same length as the other two axes. In accordance with that stated above, the roller bearing will behave quite differently dependent on the fact whether the third principal axis is longer or shorter than the other two axes. If it be shorter, the rollers will be liable to adjust themselves into a position at right angles to their normal position, when subjected to any slight shock or vibration on their arrival at the unloaded portion of the bearing. If this last mentioned principal axis of inertia be longer than the other two axes, the rollers will automatically twist themselves back into their normal position, in the event of their being slightly displaced out of this position. Experience has confirmed, that this is actually the case.

The present invention is characterized principally therein, that the rollers are proportioned in such a manner, that their moments of inertia with regard to the normal axis of rotation are in excess relatively to their moments of inertia with reference to any other axis passing through the center of gravity.

The desired shape of the ellipsoid of inertia is obtained by making the breadth or thickness of the rollers sufficiently small. In the case of a solid cylindrical roller the breadth must consequently not exceed $R\sqrt{3}$ when R denotes the radius of the roller. If the roller be hollow, not only its breadth, but also other dimensions must be taken into account, which slightly complicates the formula for calculating the moments of inertia. If for instance the radius of a central boring through the roller is $=r$, the breadth must not exceed $\sqrt{3R^2+3r^2}$ The rule in question may evidently be applied, whether the race-rings be provided with grooves, or if their surfaces of contact with the rollers be turned spherically or cylindrically, and also in the case of bearings with more than one row of rollers.

In the accompanying drawing, a roller designed in accordance with this invention is shown, in Figure 1 in front elevation and in Figure 2 in side elevation. Fig. 3 is a diagrammatic view of a roller having the shape of a hollow cylinder.

The roller shown complies with the requirement above stated as to the moments of inertia. Besides the roller has a convexed curved operative surface, the radius RA of which in an axial plane of the roller, that is, radius of curvature of the producer $p$ of the said curved surface is longer than the radius R of the great circle in the radial middle plane of the roller.

C is the center of the roller.

Having now particularly described and ascertained the nature of my said invention and in what manner the same is to be performed, I declare that what I claim is:

In a roller-bearing of the class described, a plurality of rollers each of which is of such a proportion as to breadth and radius that the moment of inertia with reference to the normal axis of revolution exceeds the moment of inertia with reference to any other axis passing through the center of gravity thereof, whereby a couple will be produced tending to return the roller to its original position.

ERNST HJALMAR WALODDI WEIBULL.